Figure 1:
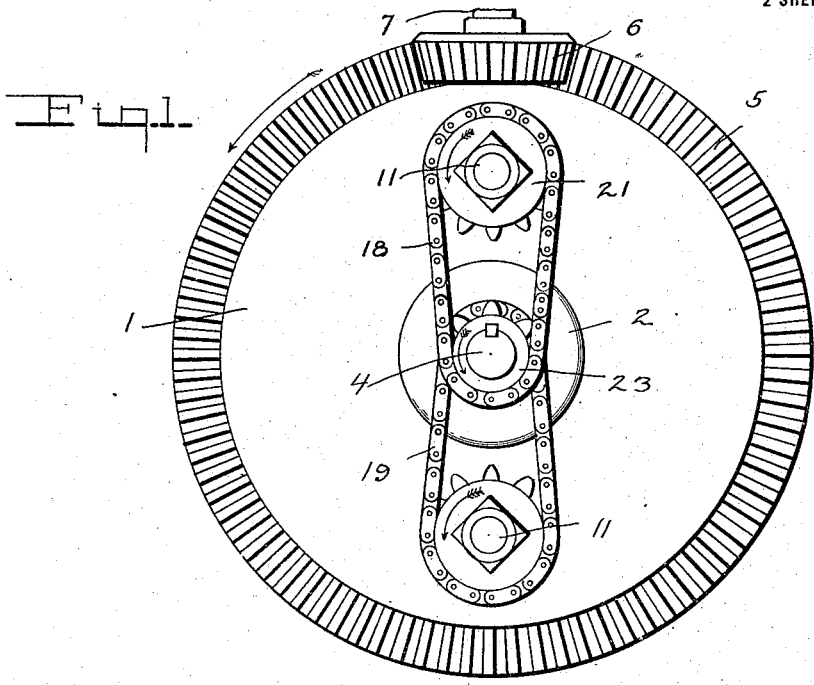

J. P. P. CARDIN.
DIFFERENTIAL GEARING FOR AUTOMOBILES, &c.
APPLICATION FILED MAY 16, 1916.

1,227,382.

Patented May 22, 1917.
2 SHEETS—SHEET 1.

Witnesses

Inventor
J. P. P. Cardin
By
Attorney

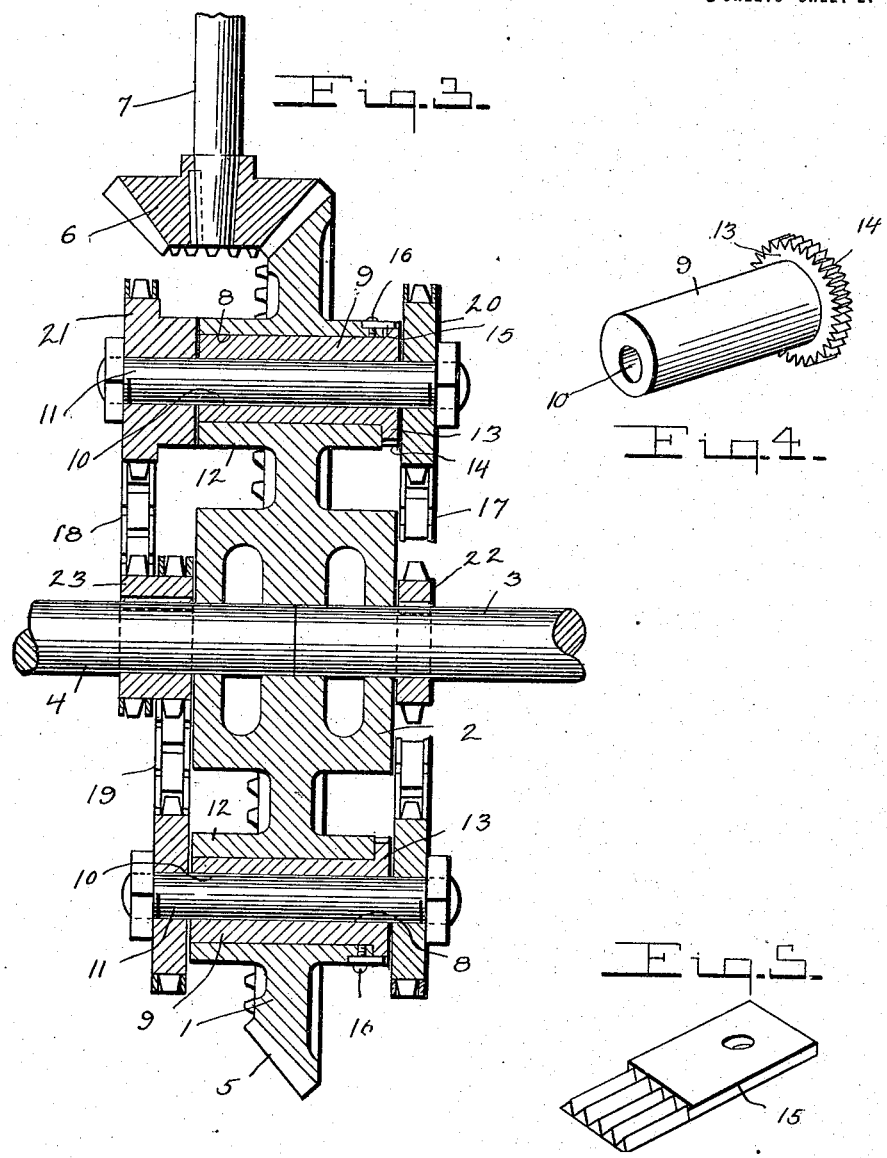

UNITED STATES PATENT OFFICE.

JOSEPH P. P. CARDIN, OF SOREL, QUEBEC, CANADA.

DIFFERENTIAL GEARING FOR AUTOMOBILES, &c.

1,227,382.

Specification of Letters Patent.   Patented May 22, 1917.

Application filed May 16, 1916. Serial No. 97,863.

*To all whom it may concern:*

Be it known that I, JOSEPH P. P. CARDIN, a subject of the King of Great Britain, residing at Sorel, in the Province of Quebec and Dominion of Canada, have invented certain new and useful Improvements in Differential Gearing for Automobiles, &c.; and I do hereby declare the following to be a full, clear, and exact description of the invention, such as will enable others skilled in the art to which it appertains to make and use the same.

The invention relates to improvements in differential gearing for automobiles, etc.

The object of the present invention is to improve the construction of differential gearing for automobiles and other motor vehicles and to provide a simple, compact, and strong construction which will be comparatively inexpensive and adapted to be readily applied to various types of automobiles and other motor vehicles.

A further object of the invention is to provide a differential gearing of this character equipped with sprocket gears and chains and provided with simple and effective means for maintaining the chains in a tight condition so as to prevent lost motion while permitting free action of the differential gearing in the operation of the invention.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings

Figure 2:
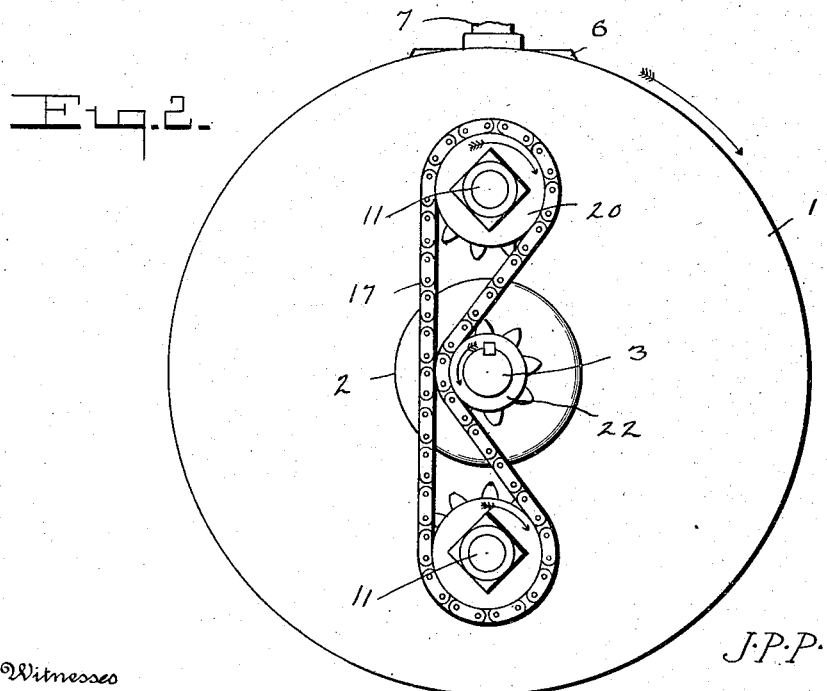

Figure 1 is a side elevation of a differential gearing constructed in accordance with this invention, Fig. 2 is a similar view showing the opposite side of the differential gearing, Fig. 3 is a sectional view of the differential gearing, Fig. 4 is a detail perspective view of the eccentric sleeve, Fig. 5 is a similar view of the pawl or dog.

Like numerals of reference designate corresponding parts in the several figures of the drawings.

In the accompanying drawings in which is illustrated a preferred embodiment of the invention, the differential sprocket gearing comprises in its construction a main gear 1 having an enlarged central or hub portion 2 which is arranged on the sections 3 and 4 of the driving shaft or axle. The main gear wheel is provided at its periphery with beveled teeth 5 which mesh with the teeth of a bevel pinion 6 mounted on the power shaft 7 which may be connected in any suitable manner with the engine or other motor of an automobile or other power vehicle. The main gear is provided at diametrically opposite points with bearing openings 8 which receive eccentric sleeves 9 having eccentrically arranged openings 10 carrying transverse shafts 11.

The main gear is provided at the bearing opening 8 with integral exteriorly arranged bosses 12 constituting spacing elements and the said eccentric sleeve is provided at one end with a flange 13 having teeth 14 which are adapted to be engaged by a pawl or dog 15 detachably secured to the adjacent boss or enlargement 12 by a suitable fastening device 16 preferably consisting of a screw and adapted to be readily loosened when it is desired to effect an adjustment of the eccentric sleeve. By adjusting the eccentric sleeve the tension of sprocket chains 17, 18 and 19 is regulated. The transverse shaft 11 carries side sprocket wheels 20 and 21 and the sections 3 and 4 of the driving shaft or axle have central sprocket wheels 22 and 23 mounted on them. The sprocket chain 17 is continuous and is arranged on the side sprocket wheels 20 and it has one of its sides or flights meshing with the central sprocket wheel 22. The other centrally arranged sprocket wheel which is keyed or otherwise secured to the section 4 of the driving shaft or axle receives the sprocket chains 18 and 19 which are arranged on and mesh with the side sprocket wheels 21. The sprocket chains rotate in the direction of the arrows indicated in Figs. 1 and 2. This arrangement enables the main gear wheel to transmit motion to the sections of the driving shaft or axle and the sprocket gearing admits of a differential movement of the said sections 3 and 4 of the driving shaft or axle to compensate for the variations in speed and the load or resistance to which the driving shaft or axles are subjected. The center gear or sprocket 22 is keyed or otherwise secured to the driving axle section 3 and the mounting of the main gear directly upon the adjacent end of the axle sections 3 and 4 provide a strong and compact construction.

What is claimed is:—

1. Differential gearing including a sectional driving shaft or axle, a main gear wheel arranged on the adjacent ends of the driving shaft or axle, centrally arranged sprocket wheels fixed to the sections of the driving shaft or axle, side sprocket wheels carried by the main gear wheel and sprocket chains arranged on the side sprocket wheels and meshing with the central sprocket wheels.

2. The combination with a sectional driving axle or shaft, of a main gear wheel arranged on the adjacent ends of the sections of the shaft or axle, central sprocket wheels fixed to the said sections of the driving shaft or axle, side sprocket-wheels carried by the main gear, a continuous sprocket chain arranged on the sprocket wheels at one side of the main gear and meshing with the central sprocket wheel and a pair of sprocket chains located at the opposite side of the main gear and arranged on the side gears and the central gear.

3. Differential gearing including a main gear wheel, side sprocket wheels mounted on the main gear wheel, a centrally arranged sprocket wheel designed to be connected with a shaft or axle and a continuous sprocket chain arranged on and meshing with the side sprocket gears and having both sides or flights located at the same side of the central sprocket gear and one side or flight meshing with the central sprocket gear.

4. Differential gearing including a main gear wheel having opposite openings, eccentrically arranged sleeves mounted in the said openings, transverse shafts carried by the eccentric sleeves, sprocket gears mounted on the transverse shafts, a central sprocket gear and a sprocket chain connecting the said sprocket gears.

5. Differential gearing including a main gear wheel provided with opposite bearing openings, eccentric sleeves mounted in the said openings and having eccentric apertures, shafts extending through the eccentric apertures of the said sleeves, the latter being provided with toothed flanges, pawls or dogs engaging the toothed flanges and securing the eccentric sleeves in their adjustment, side sprocket wheels mounted on the said transverse shafts, central sprocket wheels designed to be mounted on the sections of a driving shaft or axle, and sprocket chains connecting the said sprocket wheels and located at opposite sides of the main gear wheel.

In testimony whereof I affix my signature in presence of two witnesses.

JOSEPH P. P. CARDIN.

Witnesses:
J. E. CARDIN,
DOUAL CLAIRMONT.

Copies of this patent may be obtained for five cents each, by addressing the "Commissioner of Patents, Washington, D. C."